US007973958B2

(12) United States Patent
Shindo et al.

(10) Patent No.: US 7,973,958 B2
(45) Date of Patent: Jul. 5, 2011

(54) IMAGE FORMING APPARATUS CONDUCTING AN INTERPRETATION OPERATION

(75) Inventors: Nobuhiro Shindo, Tokyo (JP); Toshiya Suzuki, Kanagawa (JP); Yutaka Matsumoto, Saitama (JP); Takeshi Yoshizumi, Tokyo (JP); Saori Iura, Tokyo (JP); Michiaki Nishinosono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1108 days.

(21) Appl. No.: 11/723,078

(22) Filed: Mar. 16, 2007

(65) Prior Publication Data

US 2007/0223027 A1    Sep. 27, 2007

(30) Foreign Application Priority Data

Mar. 17, 2006    (JP) ................. 2006-075648

(51) Int. Cl.
G06F 3/12    (2006.01)
(52) U.S. Cl. ............ 358/1.15; 358/1.13; 358/1.16
(58) Field of Classification Search .............. None
See application file for complete search history.

(56) References Cited

U.S. PATENT DOCUMENTS

| 5,689,765 | A | 11/1997 | Nishinozono | |
|---|---|---|---|---|
| 5,970,224 | A * | 10/1999 | Salgado et al. | 358/1.16 |
| 6,384,925 | B1 * | 5/2002 | Fujiyoshi | 358/1.15 |
| 6,940,616 | B1 * | 9/2005 | Irisa | 358/1.15 |
| 7,061,633 | B1 * | 6/2006 | Shima | 358/1.15 |
| 7,505,166 | B2 * | 3/2009 | Han | 358/1.16 |
| 7,551,304 | B2 * | 6/2009 | Oomura | 358/1.15 |
| 7,564,584 | B2 * | 7/2009 | Takahashi et al. | 358/2.1 |
| 7,576,879 | B2 * | 8/2009 | Ohara | 358/1.15 |
| 2002/0063884 | A1 * | 5/2002 | Bhogal et al. | 358/1.15 |
| 2004/0165213 | A1 * | 8/2004 | Han | 358/1.15 |
| 2005/0088681 | A1 * | 4/2005 | Hosoda | 358/1.14 |
| 2005/0200889 | A1 * | 9/2005 | Oomura | 358/1.15 |

FOREIGN PATENT DOCUMENTS

| JP | 08-314649 | 11/1996 |
|---|---|---|
| JP | 11-312062 | 11/1999 |
| JP | 2000-085211 | 3/2000 |
| JP | 2003-008799 | 1/2003 |
| JP | 2003-118209 | 4/2003 |
| JP | 2004-188677 | 7/2004 |

OTHER PUBLICATIONS

JP Office Action dated Jan. 4, 2011, issued in Japanese Application No. 2006-075648.

* cited by examiner

*Primary Examiner* — King Y Poon
*Assistant Examiner* — Dung D Tran
(74) *Attorney, Agent, or Firm* — Harness, Dickey & Pierce, P.L.C.

(57) ABSTRACT

An image forming apparatus for forming images by outputting plural image data in an order corresponding to an input order of plural input data is disclosed. The image forming apparatus includes a data receiving part for receiving the input data, a priority determining part for determining priority of outputting the input data, a PDL process part having plural PDL interpretation parts including at least first and second PDL interpretation parts for performing a PDL process on the input data, and a PDL control part for controlling each of the plural PDL interpretation parts, wherein when a subsequent input data is determined to have a priority higher than that of a prior input data in a case where the first PDL interpretation part is performing a first PDL process on the prior input data, the PDL control part is configured to stop the first PDL process and cause the second PDL interpretation part to perform a second PDL process on the subsequent input data.

9 Claims, 10 Drawing Sheets

FIG.3A

OUTPUT ORDER →

| ID | 1 | 2 | 3 | ... |
|---|---|---|---|---|
| COMMUNICATION PORT | 9101 | 9100 | 9102 | |
| PRIORITY | 1 | 0 | 2 | |
| STATUS | PROCESSING | WAITING | WAITING | |
| PDL | PDL1 | – | – | |
| ... | ... | ... | ... | |

FIG.3B

OUTPUT ORDER →

| ID | 3 | 1 | 2 | ... |
|---|---|---|---|---|
| COMMUNICATION PORT | 9102 | 9101 | 9100 | |
| PRIORITY | 2 | 1 | 0 | |
| STATUS | PROCESSING | TEMPORARILY STOPPED | WAITING | |
| PDL | PDL2 | PDL1 | – | |
| ... | ... | ... | ... | |

|  | FOR PDL 1 | FOR PDL 2 |
|---|---|---|
| DESTINATION SHEET FEED TRAY | TRAY 1 | MANUAL SHEET FEED TRAY |
| SHEET SIZE | A4 | A3 |
| SHEET TYPE | PLAIN PAPER | CARD BOARD PAPER |
| RESOLUTION | 600dpi | 300dpi |
| ... | ... | ... |
|  |  |  |

| ID | 1 | 2 | 3 | ... |
|---|---|---|---|---|
| COMMUNICATION PORT | 9101 | 9100 | 9102 | |
| PRIORITY | 1 | 0 | 2 | |
| STATUS | PROCESSING | WAITING | WAITING | |
| PDL | PDL1 | – | – | |
| ... | ... | ... | ... | |

FIG.9A

| RAW PORT NUMBER | PRIORITY |
|---|---|
| 9100 | 0 |
| 9101 | 1 |
| 9102 | 2 |

FIG.9B

| COMMUNICATION PROTOCOL | PRIORITY |
|---|---|
| RAW PORT | 0 |
| LPR | 1 |
| Apple Talk | 2 |
| IPP | 1 |

FIG.9C

| PRINTER NAME | PRIORITY |
|---|---|
| "lp1" | 0 |
| "lp2" | 1 |
| "lp3" | 2 |
| "lp4" | 3 |

FIG.10A

```
<ESC>%-12345X@PJL JOB NAME="NORMAL PRINTING DOCUMENT"
@PJL PRIORITY=0
@PJL SET DATE="2006/01/20"
@PJL SET TIME="22:33:35"
@PJL ENTER LANGUAGE=PCL
 .
 .
 .
```

FIG.10B

```
<ESC>%-12345X@PJL JOB NAME="URGENT PRINTING DOCUMENT"
@PJL PRIORITY=1
@PJL SET DATE="2006/01/20"
@PJL SET TIME="22:33:51"
@PJL ENTER LANGUAGE=PCL
 .
 .
 .
```

IMAGE FORMING APPARATUS CONDUCTING AN INTERPRETATION OPERATION

BACKGROUND OF THE INVENTION

1. Field of the Invention

The present invention relates to an image forming apparatus for conducting an interruption operation.

2. Description of the Related Art

In a case where a conventional image forming apparatus (e.g., printer) receives a printing request (latest printing request) in the midst of executing an accepted printing job corresponding to a previously received printing request (former printing request), the printing job corresponding to the latest printing request is executed after the image forming apparatus has finished executing all of the accepted printing jobs corresponding to former printing requests received before receiving the latter printing request. That is, in a case where there is an urgent printing job, all of the unfinished accepted printing jobs corresponding to previously received printing requests are to be cancelled in order for the urgent printing job to be executed. Accordingly, it is desired for an image forming apparatus to prioritize execution of a designated printing job without having to cancel all of the accepted printing jobs.

As one example, Japanese Laid-Open Patent Application No. 2003-118209 discloses a job management apparatus in which a required job type can be executed preferentially for individual jobs with a priority attached. Japanese Laid-Open Patent Application No. 2003-118209 describes that the job management apparatus is for managing plural jobs. The job management apparatus includes a priority job designating part for designating a job to be executed preferentially for individual jobs and a priority job registering part for registering a job which is to be preferentially executed with respect to the job designated by the priority job designating part.

Although the job management apparatus can change the job execution order by attaching priorities to individual jobs, in an actual image forming apparatus, it is difficult to interrupt a job and initiate a PDL (Page Description Language) process when the PDL process is already being executed for another job.

SUMMARY OF THE INVENTION

The present invention may provide an image forming apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides 1. An image forming apparatus for forming images by outputting a plurality of image data in an order corresponding to an input order of a plurality of input data, the image forming apparatus including: a data receiving part for receiving the input data; a priority determining part for determining priority of outputting the input data; a PDL process part having a plurality of PDL interpretation parts including at least first and second PDL interpretation parts for performing a PDL process on the input data; and a PDL control part for controlling each of the plural PDL interpretation parts; wherein when a subsequent input data is determined to have a priority higher than that of a prior input data in a case where the first PDL interpretation part is performing a first PDL process on the prior input data, the PDL control part is configured to stop the first PDL process and cause the second PDL interpretation part to perform a second PDL process on the subsequent input data.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.
[Configuration]

Figure 1:
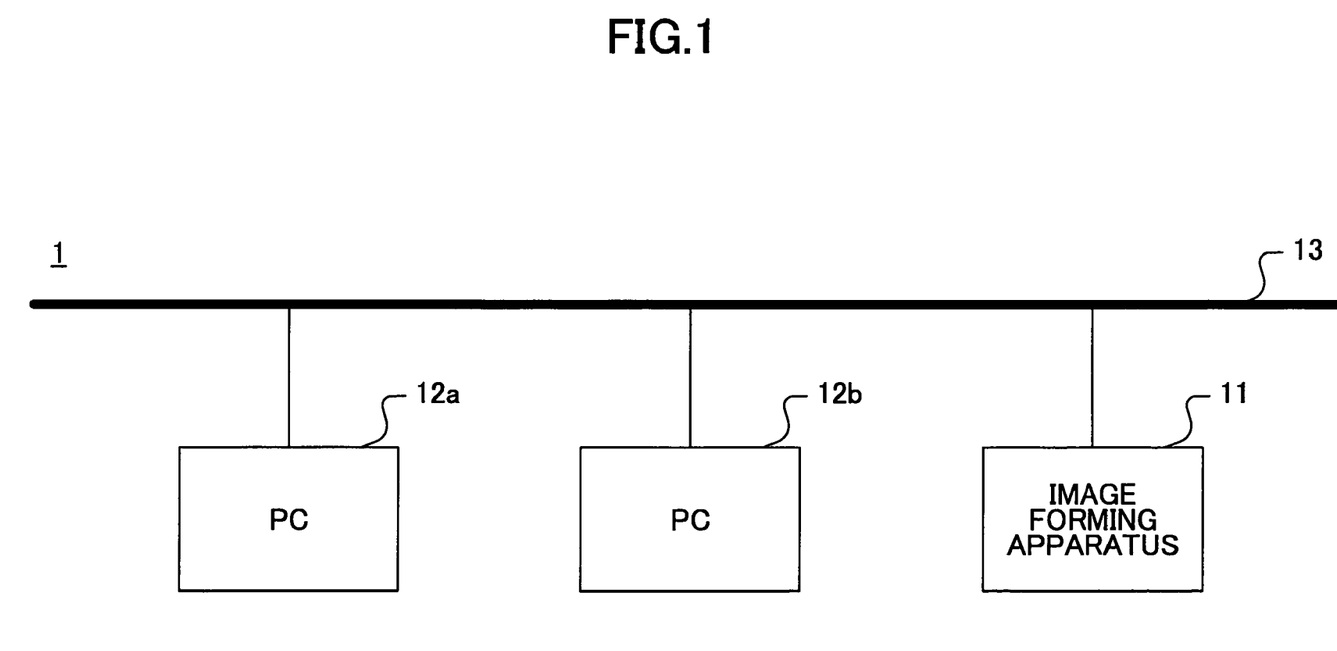
FIG. 1 is a schematic diagram showing an exemplary configuration of an image forming system having an image forming apparatus according to an embodiment of the present invention.

FIG. 1 is a schematic diagram showing an exemplary configuration of an image forming system 1 including an image forming apparatus 11 according to an embodiment of the present invention.

In the image forming system 1, the image forming apparatus 11 is connected to personal computers 12a and 12b which serve as host terminals (e.g., servers) and a network 13 (e.g., Local Area Network (LAN)).

Figure 2:
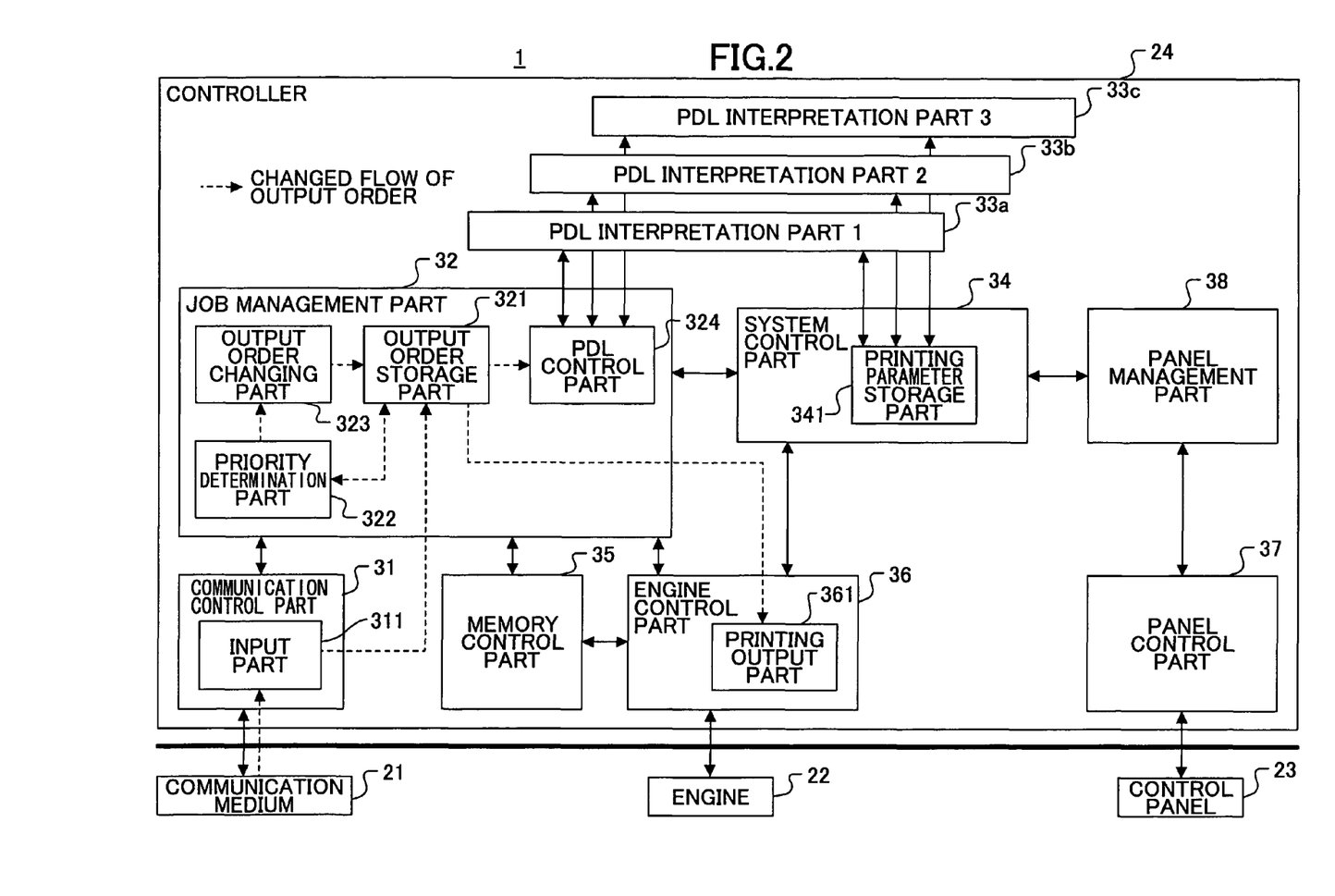
FIG. 2 is a block diagram showing an exemplary configuration of an image forming apparatus according to an embodiment of the present invention.

FIG. 2 is a block diagram showing an exemplary configuration of the image forming apparatus 1 provided with various modules according to an embodiment of the present invention.

The image forming apparatus 1 shown in FIG. 2 includes a communication medium 21, an engine 22, a control panel 23, and a controller 24. The communication medium is for sending and receiving data with respect to a host terminal (in this example, PC 12a or 12b) via the network 13. The engine is for printing output image data. The control panel 23 is for enabling the user to perform various operations and settings on the image forming apparatus 1 and displaying various data (e.g., status of image forming apparatus 1) to the user. The controller 24 is for controlling the communication medium 21, the engine 22, and the control panel 23. The communication medium 21, the engine 22, the control panel 23, and the controller 24 are connected to each other by a bus.

The controller 24 includes a communication control part 31, a job management part 32, PDL interpretation parts 33a, 33b, 33c (also referred to as first PDL interpretation part 33a, second PDL interpretation part 33b, and third PDL interpretation part 33c), a system management part 34, a memory control part 35, an engine control part 36, a panel control part 37, and a panel management part 38.

The communication control part 31 includes an input part 311 for receiving data from the host terminal 12a, 12b via the communication medium 21. Furthermore, the communication control part 31 interprets a communication protocol and a printing protocol and transmits the interpretation results including various parameters (e.g., communication port number, printer name) and PDL data transmitted from the host terminal 12a, 12b to the job management part 32.

The job management part 32 is a control part for determining priority based on a priority determination parameter(s) transmitted from the communication control part 31, changing the order of processing jobs according to the priority determination, and controlling the PDL interpretation parts 33a-33c according to the changed job processing order. The job management part 32 includes an output order storage part 321, a priority determination part 322, an output order changing part 323, and a PDL control part 324. The output order storage part 321 is for storing the order for outputting data in accordance with the order of data received from the input part 311. The priority determination part 322 is for determining priority of processing jobs based on the priority determination parameter transmitted from the communication control part 31. The output order changing part 323 is for changing the output order stored in the output order storage part 321 according to the priority determined by the priority determination part 322. The PDL control part 324 is for controlling each of the PDL interpretation parts 33a-33c in accordance with a changed output order in a case where the output order stored in the output order storage part 321 is changed. Each PDL interpretation part 33a-33c is for processing PDL data received from the job management part 32 (PDL process).

In one example, when the communication control part 31 receives data from the communication medium, the input part 311 inputs the received data to the job management part 32. Then, the job management part 32 temporarily stores the order of outputting the received data (output order) in the output order storage part 321 according to the order of receiving data from the input part 311. Then, the priority determination part 322 determines the priority for outputting data requested to be printed out by the host terminal 12a, 12b. Then, the output order changing part 323 changes the output order stored in the output order storage part 321 in accordance with the determination of the priority determination part 322. After the output order stored in the output order storage part 321 is changed, the PDL control part 324 controls each of the PDL interpretation parts 33a, 33b, 33c so that each of the PDL interpretation parts 33a, 33b, 33c processes PDL data in correspondence with the changed output order. For example, in a case where the output order is changed so that new PDL data (subsequent PDL data) is determined to be processed before previous PDL data (prior PDL data) which is already in the middle of being processed by the first PDL interpretation part 33a, the PDL control part 324 stops (interrupts) the processing of the first PDL interpretation part 33a and controls the second PDL interpretation part 33b so that the second PDL interpretation part 33b can perform a PDL process on the new PDL data (subsequent PDL data). After the second PDL interpretation part 33b completes the PDL process, the PDL control part 324 controls the first PDL interpretation part 33a so that the first PDL interpretation part 33b can resume processing the previous PDL data (prior PDL data).

The PDL interpretation parts 33a-33c perform the PDL process by interpreting PDL data transmitted from the communication control part 31 via the job management part 32 and returning the interpretation results as image data to the job management part 32. The PDL interpretation parts comprise three PDL interpretation parts 33a, 33b, 33c according to this embodiment of the present invention since priority is divided into three levels (0, 1, 2). In this example, priority is higher as the number of the level of the priority is larger.

The system management part 34 stops (interrupts) and starts (resumes) each of the PDL interpretation parts 33a-33c according to the request from the job management part 32. Furthermore, the system management part 34 includes a printing parameter storage part 341 for storing printing parameters corresponding to each of the PDL interpretation parts 33a-33c.

The memory control part 35 is for storing image data output from the PDL interpretation parts 33a-33c via the job management part 32.

The engine control part 36 is for controlling the engine 22. The engine control part 36 includes a printing output part 36 for enabling the engine to print image data stored in the memory control part 35 according to the output order stored in the output order storage part 321 of the job management part 32.

The panel control part 37 is for controlling the control panel 23. The panel management part 38 is for managing, for example, the display of the setting menu or the engine status displayed on the control panel 23 via the panel control part 37.

[Operation Flow when Output Order is Changed]

Figure 3A:
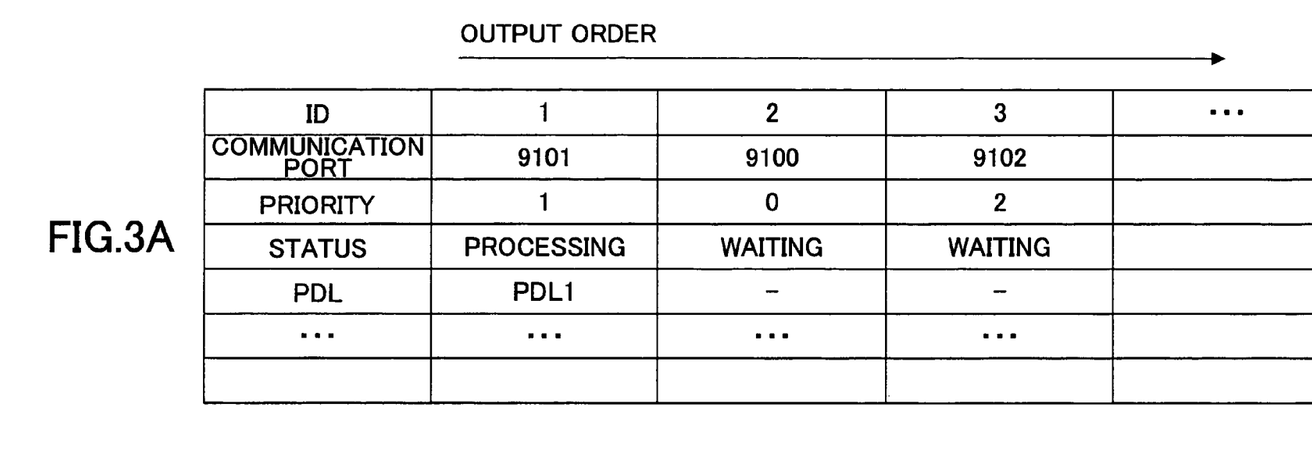
FIG. 3A is a schematic diagram for describing an exemplary configuration of an output order storage part according to an embodiment of the present invention in a case before output order is changed.
Figure 3B:
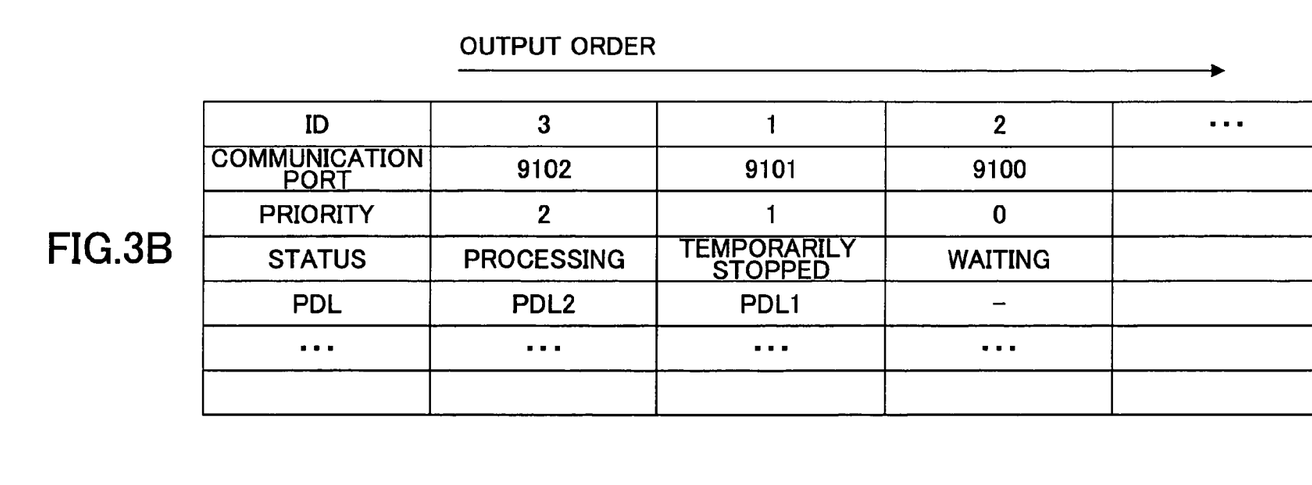
FIG. 3B is a schematic diagram for describing an exemplary configuration of an output order storage part according to an embodiment of the present invention in a case after output order is changed.

FIGS. 3A and 3B are schematic diagrams for describing the configuration of the output order storage part 32 (shown in FIG. 2) before and after the output order is changed, respectively.

The output order storage part 32 includes a table for managing, for example, data shown in FIGS. 3A and 3B. Each column in the table includes, for example, ID (identification) data for identifying data to be output, communication port data for indicating a port number transmitted from the communication control part 31 for performing Raw port printing, priority data for indicating the output priority determined by the priority determination part 322, status data for indicating the status of the PDL interpretation process of the PDL interpretation parts 33a-33c, and PDL interpretation part number data for indicating the number of the PDL interpretation part for performing the PDL process. In the table shown in FIGS. 3A and 3B, the output order is stored in accordance with the order in which the data items are arranged in the table. Furthermore, the priority is indicated with the values of 0 to N−1 ("N" being the number of PDL interpretation parts). As described above, priority is higher as the number of the level of the priority is larger.

In the table shown in FIG. 3A, data items identified as ID=1, 2, 3, . . . are stored in the order of the ID=1, 2, 3, . . . The data ID=1 having priority level "1" is being processed by the first PDL interpretation part 33a. The data ID=2 having priority level "0" is in a waiting state. The data ID=3 having priority level "2" is also in a waiting state.

In a case where the output order (initially stored in the arrangement order of the table shown in FIG. 3A) is changed by the output order changing part 323 in accordance with priority, the data items in the table of the output storage part 321 are rewritten in a manner shown in FIG. 3B. After the output order is changed, the data items identified as ID=1, 2, 3, . . . are rearranged in the order of ID=3, 1, 2, . . . The data ID=3 having priority level "2" is processed by the second PDL interpretation part 2. The data ID=1 having priority level "1", which was being processed before the change of output order, is in a temporarily stopped state. The data ID=2 having priority level "0" remains the same as the state before the change of output order (i.e. waiting state).

Figure 4:
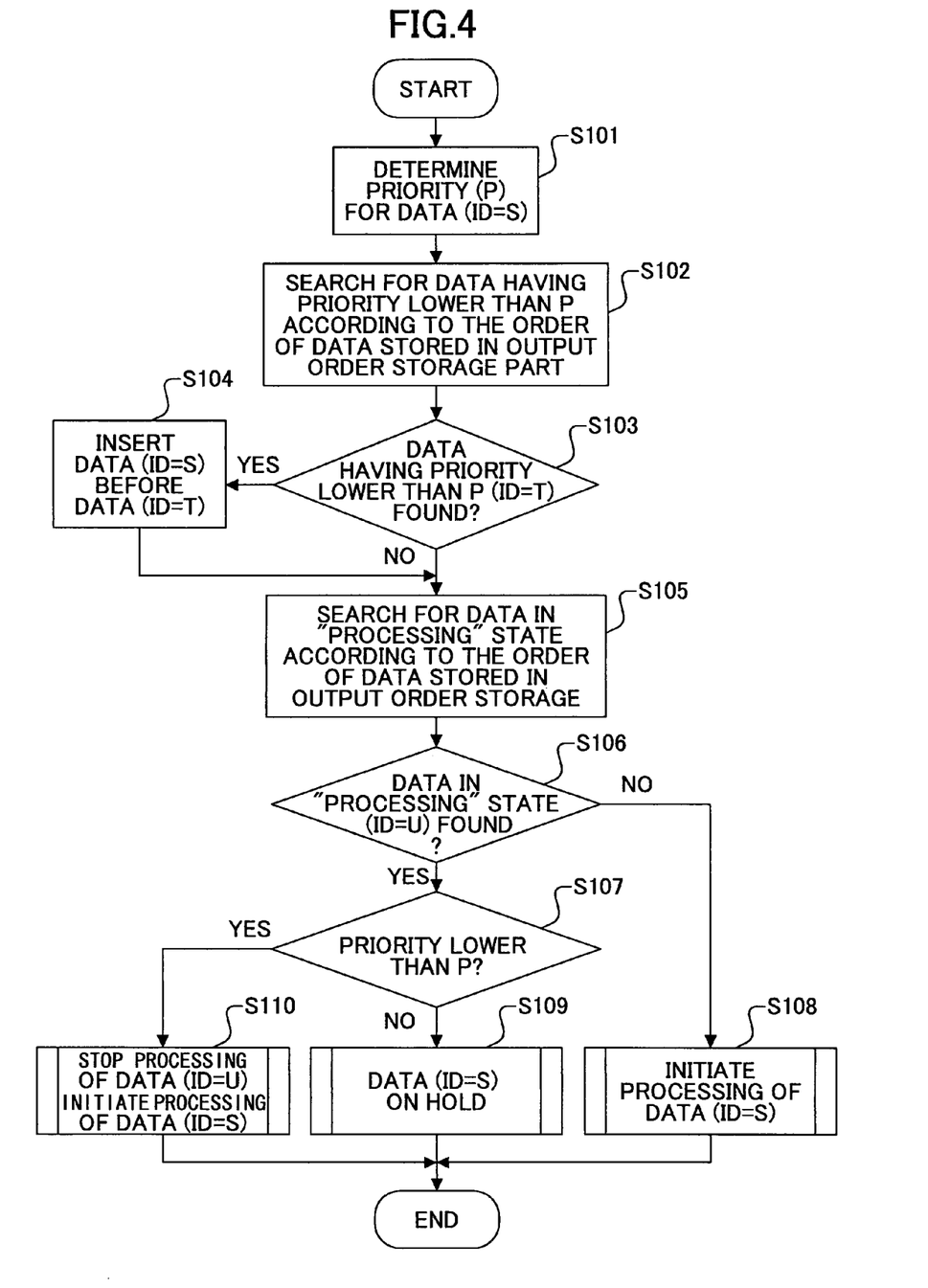
FIG. 4 is a flowchart showing an exemplary operation for changing the output order by an output order changing part and a PDL control part 324 according to an embodiment of the present invention.

The above-described change of output order is conducted by the output order changing part 323 and the PDL control part 324. FIG. 4 is a flowchart showing an exemplary operation for changing the output order by the output order changing part 323 and the PDL control part 324.

When new data is transmitted from the communication control part 31 to the job control part 32, the job control part 32 assigns an ID (=S) to the new data. Then, the output order storage part 321 stores the ID assigned to the new data and related data corresponding to the new data in a table as shown in FIG. 3A. At this stage, the related data corresponding to the new data ID=S is stored at a last part (bottom part) of the output order storage part 321. Furthermore, at this stage, the priority of the new data ID=S is not yet determined.

After the data of data ID=S is stored in the output order storage part 321, the priority determination part 322 determines the priority (priority level) P of the new transmitted data according to a priority determination parameter transmitted from the communication control part 31 by referring to a priority determination table. The priority determination table is described in detail below.

After priority P is determined, the output order changing part 323 searches for data having a priority lower than the determined priority P starting from data stored at a beginning part (top part) of the output order storage part 321 (Step S102). In a case where data having a priority lower than P (referred to as data ID=T) is found (Yes in Step S103), the output order changing part 323 deletes the related data corresponding to data ID=S stored at the last part (bottom part) of the output order storage part 321 and inserts the related data corresponding to data ID=S in front of the related data corresponding to data ID=T (Step S104). In a case where the related data corresponding to data ID=T is stored at the beginning part (top part) of the output order storage part 321, the output order changing part 323 sends a report to the engine control part 36 requesting that output of data corresponding to data ID=T be stopped. Then, the operation continues to Step S105.

In a case where data having a priority lower than P is not found (No in Step S103), the operation directly proceeds to Step S105. In Step S105, the PDL control part 324 searches for data in a "processing" state starting from data stored at the beginning part (top part) of the output order storage part 321. That is, the PDL control part 324 searches for data that is currently being processed by one of the PDL interpretation parts 33a-33c. In a case where data being in a "processing" state is found (referred to as data ID=U) (Yes in Step S106), the PDL control part 324 determines whether the priority of the data ID=U is lower than the priority P determined in Step S101 (Step S107). In a case where the priority of data ID=U is higher than priority P (No in Step S107), the operation proceeds to Step S109. In a case where the priority of data ID=U is lower than priority P (Yes in Step S107), the operation proceeds to Step S110. In Step S109, the PDL control part 324 holds (reserves) the data corresponding to data ID=S. That is, the PDL control part 324 sets the status of the data ID=S to a "waiting" state. Meanwhile, in Step S110, the PDL control part 324 controls the PDL interpretation part 33a or 33b so that the currently running PDL process for data ID=U is stopped and controls the PDL interpretation part 33a or 33b so that a PDL process can be initiated for data ID=S. That is, the PDL control part 324 changes the status of the data ID=U from a "processing" state to a "temporarily waiting" state and sets the status of the ID=S to a "processing" state.

In a case where data being in a "processing" state is not found (No in Step S106), the PDL control part 324 controls the PDL interpretation part 33a so that a PDL process is initiated for data ID=S. That is, the PDL control part 324 sets the status of data ID=S to a "processing state".

Figure 5:
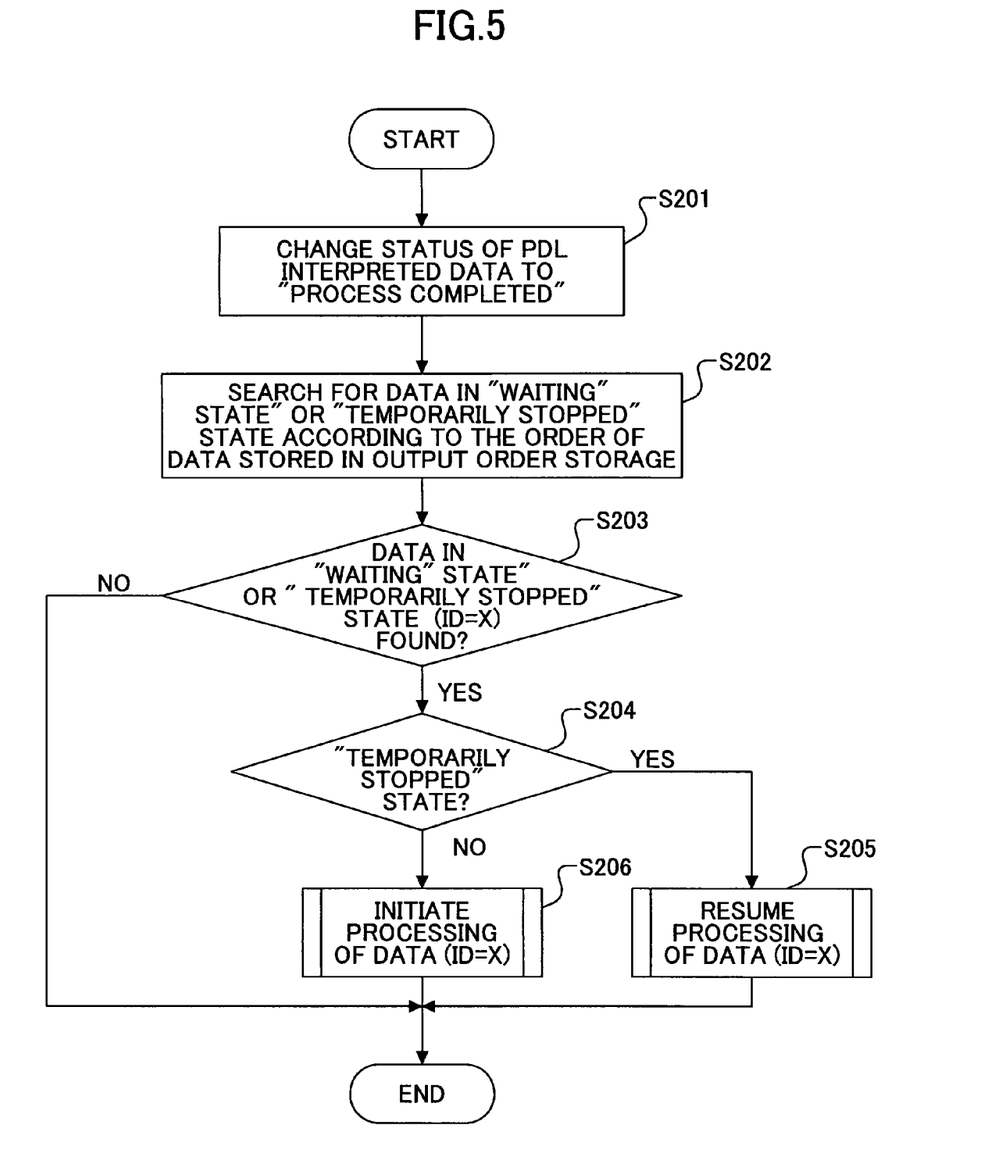
FIG. 5 is a flowchart showing an exemplary operation of a PDL control part after completion of a PDL process.

Next, an exemplary operation of the PDL control part 324 after performing a PDL process on predetermined data (completion of PDL process) is described with reference to FIG. 5. FIG. 5 is a flowchart showing an exemplary operation of the PDL control part 324 after completion of a PDL process.

When a PDL process is completed with respect to predetermined data, the PDL control part 324 changes the status of the processed data to a "process completed" state (Step S201).

Next, the PDL control part 324 searches for data in a "waiting" state or a "temporarily stopped" state in the order of data stored in the output order storage part 321 (Step S202). In a case where data being in a "waiting" state or a "temporarily stopped" state is found (referred to as data ID=X) (Yes in Step S203), the PDL control part 324 determines whether the data ID=X is in a "temporarily stopped" state (Yes in S204). In a case where data ID=X is in a "temporarily stopped" state, the PDL control part 324 controls the PDL interpretation part 33a or 33b so that the PDL interpretation part 33a or 33b resumes the PDL process for data ID=X (Step S205).

Meanwhile, in a case where the data ID=X is not in a "temporarily stopped" state or where the data ID=X is in a "waiting" state (No in Step 204), the PDL control part 324 controls the PDL interpretation part 33*a* or 33*b* so that the PDL interpretation part 33*a* or 33*b* initiates a PDL process with respect to data ID=X (Step S206).

Furthermore, in a case where data being in a "waiting" state or a "temporarily stopped" state is not found (No in Step S203), the operation of the PDL control part 324 is finished.

Figure 6:
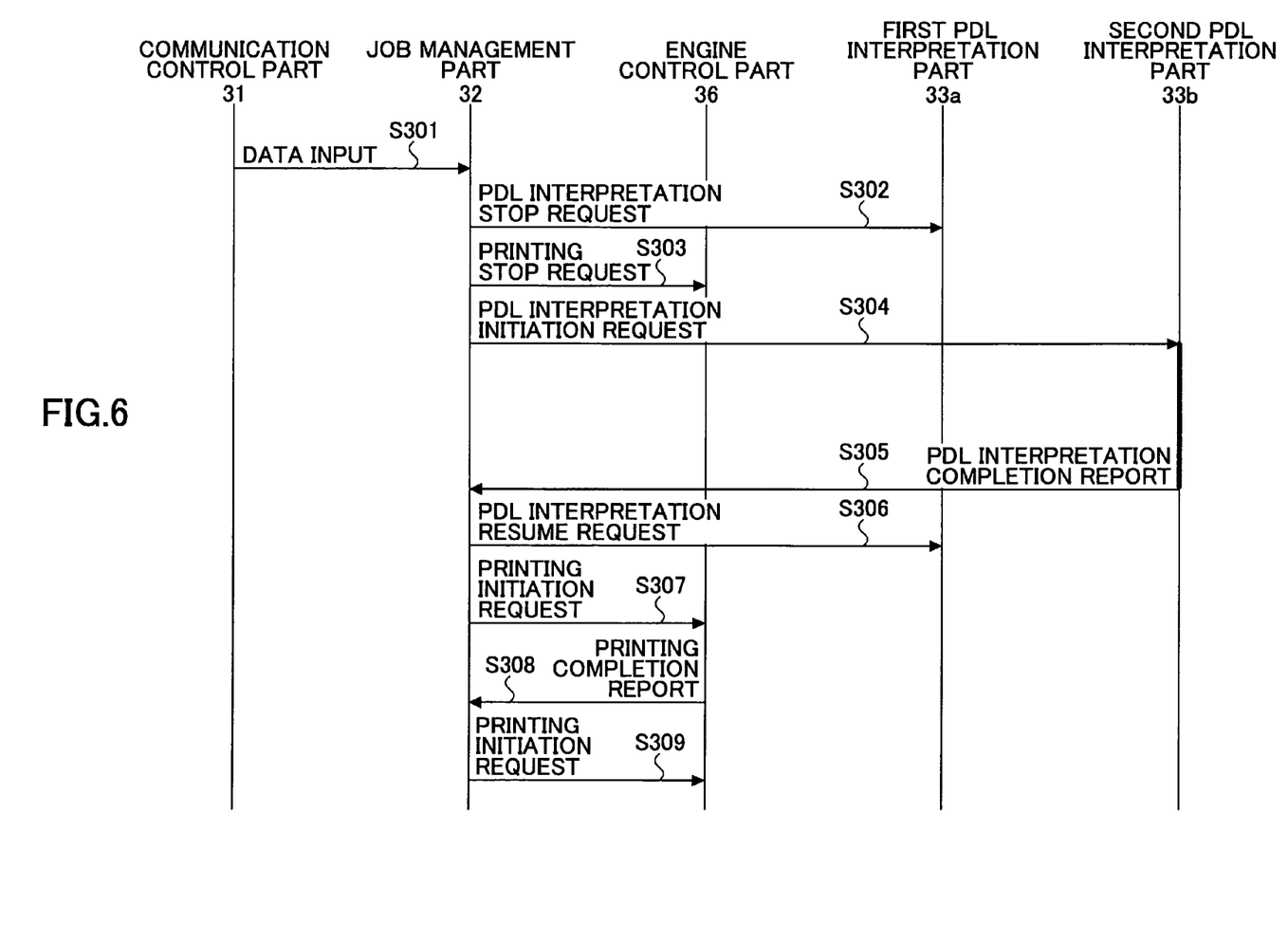
FIG. 6 is a sequence diagram showing an exemplary operation of each module in the image forming apparatus 1 according to an embodiment of the present invention in a case where the output order is changed.

Although the operation of changing the output order has been described above with reference to the flowcharts shown in FIGS. 4 and 5, a further description of the operation of changing the output order is described below for explaining the operation of each part (module) in the image forming apparatus 1 by referring to FIG. 6. FIG. 6 is a sequence diagram showing an exemplary operation of each module in the image forming apparatus 1 in a case where the output order is changed.

First, new data (subsequent data) is input to the job management part 32 from the communication control part 31 (Step S301). The job management part 32 starts the output order changing operation described in FIG. 4 at the timing of input of the new data.

In a case where the output order stored in the output order storage part 321 is changed by the output order changing part 323 in the job management part 32, the job management part 32 transmits a PDL stop request to the first PDL interpretation part 33*a* if the first PDL interpretation part 33*a* is in the middle of performing a PDL process on a previous data (prior data), to thereby stop (interrupt) the PDL process of the first PDL interpretation part 33*a* (Step S302).

In a case where the output order is changed so that the new data transmitted from the communication control part 31 is arranged at the beginning (top), the job management part 32 transmits a printing stop request to the engine control part 36 (Step S303). Accordingly, the engine control part 36 controls the engine 22 so that the engine 22 temporarily stops the output of printing data (image data).

Next, the job management part 32 transmits a PDL initiation request to the second PDL interpretation part 33*b* (Step S304), to thereby cause the second PDL interpretation part 33*b* to initiate performing a PDL process on the new data transmitted from the communication control part 31.

Then, after the completion of the PDL process by the second PDL interpretation part 33, the second PDL interpretation part 33*b* transmits a PDL interpretation completion report to the job management part 32 (Step S305). Accordingly, the job management part 32, being informed of the completion of the PDL process of the second PDL interpretation part 33*b*, transmits a PDL interpretation resume request to the first PDL interpretation part 33*a* (Step S306). Accordingly, the first PDL interpretation part 33*a* resumes the previously stopped PDL process of Step S302.

Then, the job management part 32 transmits a printing initiation request to the engine 36 (Step S307) for printing image data obtained as a result of the PDL process by the second PDL interpretation part 33*b*. Accordingly, the engine control part 36 controls the engine 22 so that the engine 22 initiates an output process of the image data. Then, after the output process of the engine 22 is completed, the engine control part 36 transmits a printing completion report to the job management part 32 (Step S308). Accordingly, the job management part 32, being informed of the completion of output of the new data arranged at the top of the output order, deletes the new data arranged at the top of the output order from the output order storage part 321. Then, the job management part 32 transmits a printing initiation request to the engine control part 36 (Step S309), to thereby allow the engine control part 36 to control the engine 22 so that the engine 22 initiates an output process of the next image data (data arranged after the new data). In a case where the output process of the engine 22 is temporarily stopped (interrupted) in Step S303, the engine control part 36 controls the engine 22 so that the engine 22 resumes the temporarily stopped output process.

It is to be noted that the first, second, and third PDL interpretation parts 33*a*, 33*b*, and 33*c* perform the PDL processes based on printing parameters corresponding to the data to be processed. Although the processing of data by the first and second PDL interpretation parts 33*a* or 33*b* is temporarily stopped in a case where the output order is changed, the printing parameters used for processing the data are stored in the printing parameter storage part 341 of the system control part 34.

Figure 7:
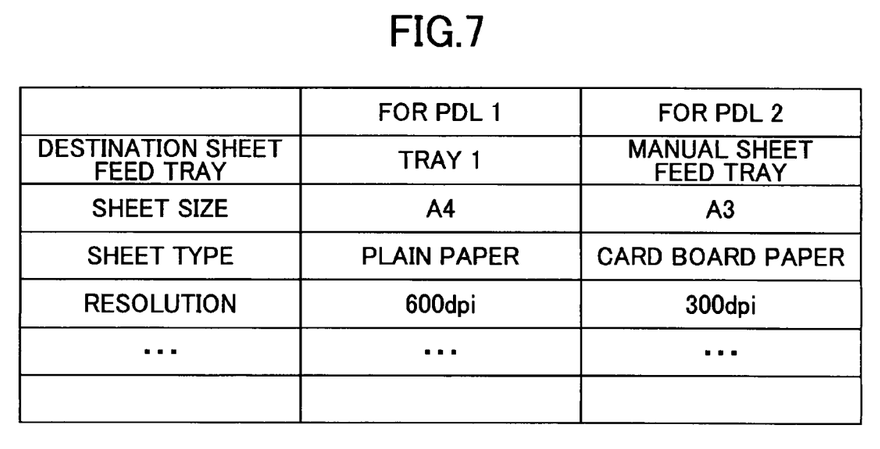
FIG. 7 is schematic diagram showing an example of a printing parameter storage table stored in a printing parameter storage part according to an embodiment of the present invention.

FIG. 7 shows an example of the printing parameter storage table stored in the printing parameter storage part 341. The printing parameters used by the PDL interpretation parts 33*a*, 33*b* are indicated in corresponding columns of the table. Each column includes items such as "destination sheet feed tray", "sheet size", "sheet type" and "resolution". The PDL interpretation part 33*a* and 33*b* set and refer to the corresponding printing parameters.

As described above, since the image forming apparatus according to an embodiment of the present invention is provided with a part for processing images with PDL, that is, a PDL process part comprising plural PDL interpretation parts, a subsequently input job having high priority can be processed before a previously input job without having to cancel all of the jobs that are in the midst of PDL processing or printing.

[Storage of Output Order]

The output order storage part 321 shown in FIG. 2 may store the output order according to a queue. That is, the output order storage part 321 may store the output order according to queues which only include data assigned with an ID.

Figure 8A:
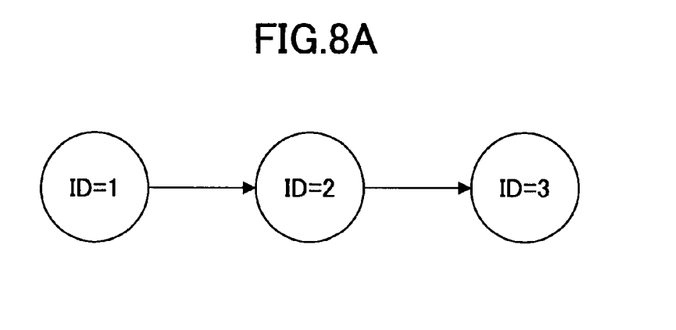
FIG. 8A is a schematic diagram showing an output order management queue stored in an output order storage part before changing of the output order according to an embodiment of the present invention.
Figure 8B:
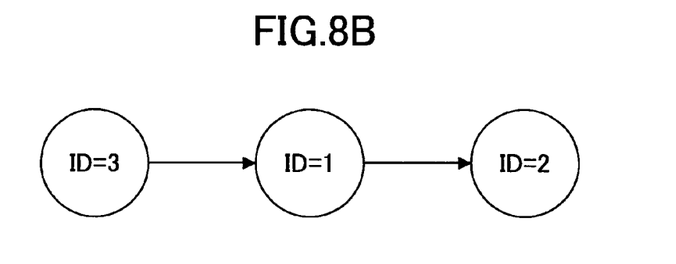
FIG. 8B is a schematic diagram showing an output order management queue stored in an output order storage part after changing of the output order according to an embodiment of the present invention.
Figure 8C:
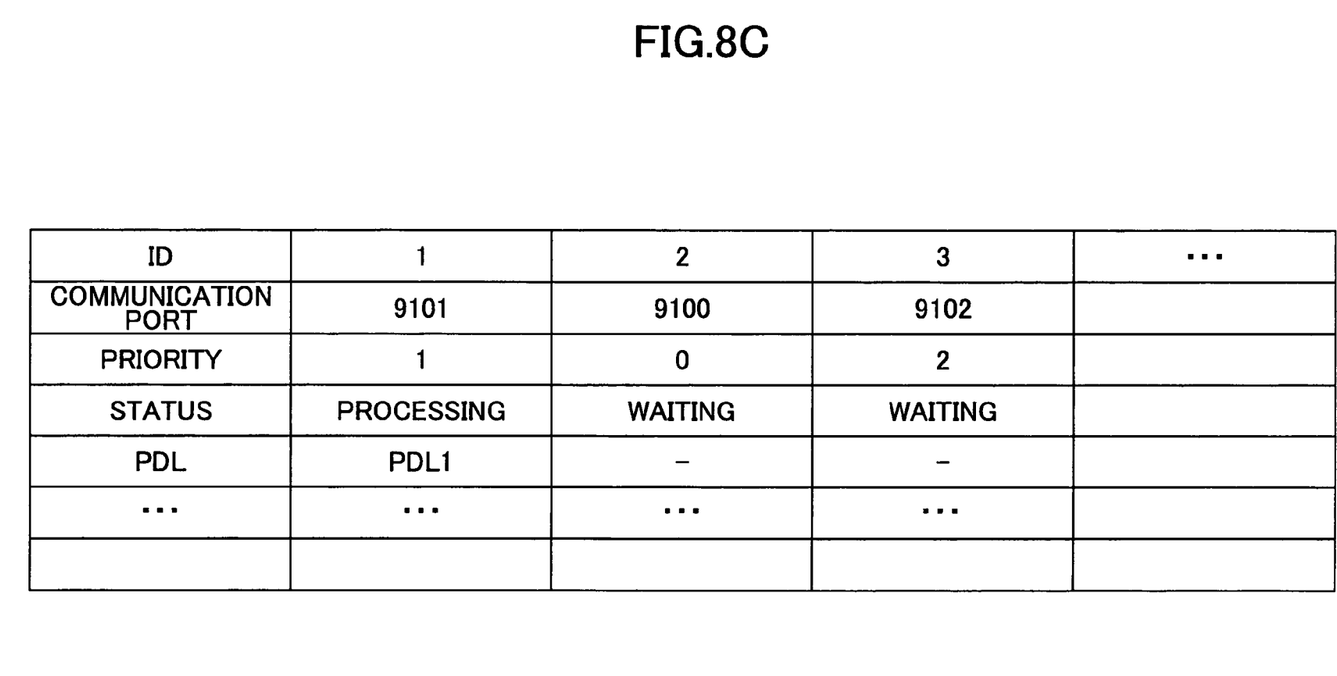
FIG. 8C is a schematic diagram showing an exemplary configuration of an output order storage part including a status management table according to an embodiment of the present invention.

FIGS. 8A-8C are schematic diagrams for describing an output order management queue stored in the output order storage part 321 according to an embodiment of the present invention. More specifically, FIG. 8A is a schematic diagram showing an output order management queue before changing of the output order, FIG. 8B is a schematic diagram showing an output order management queue after changing of the output order, and FIG. 8C is a status management table. For example, in a case where the output order storage part 321 includes a status management table shown in FIG. 8C, the output order management queue before the changing of the output order is stored in a manner shown in FIG. 8A in which the stored data items are arranged in an order of ID=1, ID=2, and ID=3. Then, after the output order is changed according to the priorities (priority levels) set in the status management table shown in FIG. 8C, the output order management queue is changed in a manner shown in FIG. 8B in which the stored data items are arranged in an order of ID=3, ID=1, and ID=2. Furthermore, since the PDL interpretation parts 33*a*-33*c* are controlled in accordance with the change of output order, corresponding items "status" and "PDL" in the status management table of FIG. 8C are also changed.

Thus, by storing the output order in the form of a queue in the output order storage part 32, the output order can be changed simply by rewriting the output management queue in a case of changing the output order. Compared to the operation described with FIGS. 3A and 3B, the operation of changing the output order can be conducted more easily by inserting or deleting the entire column of the status management table.

[Determination of Priority]

As described above, the priority determination part 322 determines priority (priority level) of new transmitted data according to a priority determination parameter transmitted from the communication control part 31 by referring to a priority determination table. Next, examples of the priority parameter are described with reference to FIGS. 9A-9C.

Figure 9A:
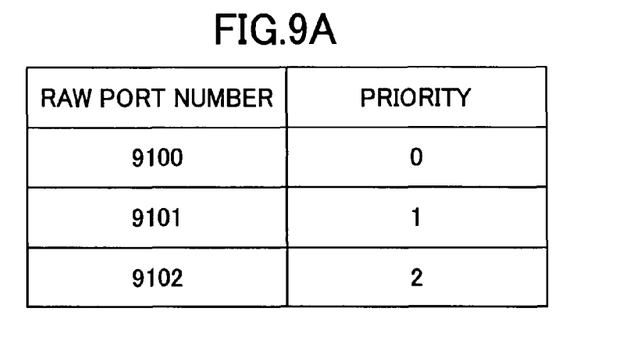
FIG. 9A is an exemplary priority determination table that determines priority according to a Raw port number according to an embodiment of the present invention.

FIG. 9A is an exemplary priority determination table that determines priority according to a Raw port number. The table shown in FIG. 9A shows corresponding relationships between a port number during Raw port printing and a priority (priority level). The table of FIG. 9A shows that priority becomes higher in an order of port 9100, port 9101, and 9102.

Figure 9B:
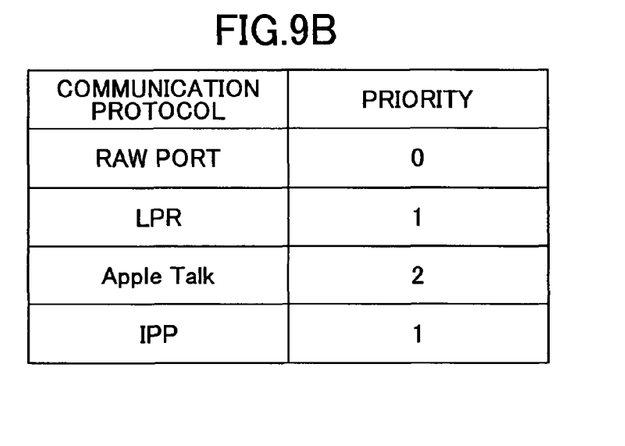
FIG. 9B is an exemplary priority determination table that determines priority according to a protocol according to an embodiment of the present invention.

FIG. 9B is another exemplary priority determination table that determines priority according to communication protocol. The table in FIG. 9B shows corresponding relationships between a communication protocol and a priority (priority level). The table of FIG. 9B shows that priority is lowest when the communication protocol is Raw port printing and that priority is highest when the communication protocol is Apple Talk printing. The priority for LPR (Line PRinter daemon protocol) printing and IPP (Internet Printing Protocol) printing is the same and is ranked between the priority of Raw port printing and Apple Talk printing.

Figure 9C:
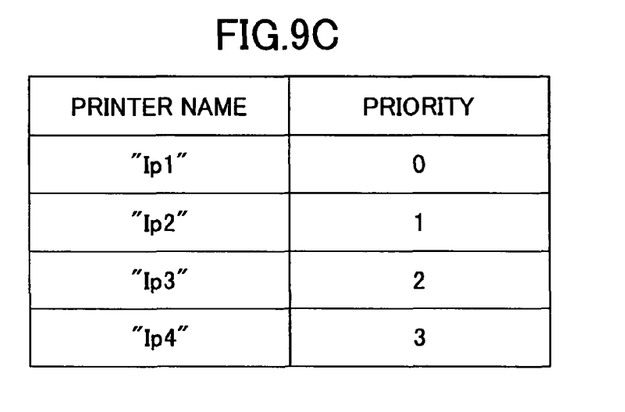
FIG. 9C is an exemplary priority determination table that determines priority according to a printer name.

FIG. 9C is an exemplary priority determination table that determines priority according to a printer name. The table in FIG. 9C shows corresponding relationships between a printer name designated by LPR protocol and a priority (priority level). The table of FIG. 9C shows that priority becomes higher in an order of printer "lp1", "lp2", "lp3", and "lp4".

Accordingly, priority can be arbitrarily set according to, for example, communication port, communication protocol, and printer name. By managing the priority and priority determination parameters with a table shown in FIGS. 9A-9C, the changing of priority can be easily conducted.

Alternatively, priority may be determined according to priority written in the data transmitted from the communication control part 31.

Figure 10A:
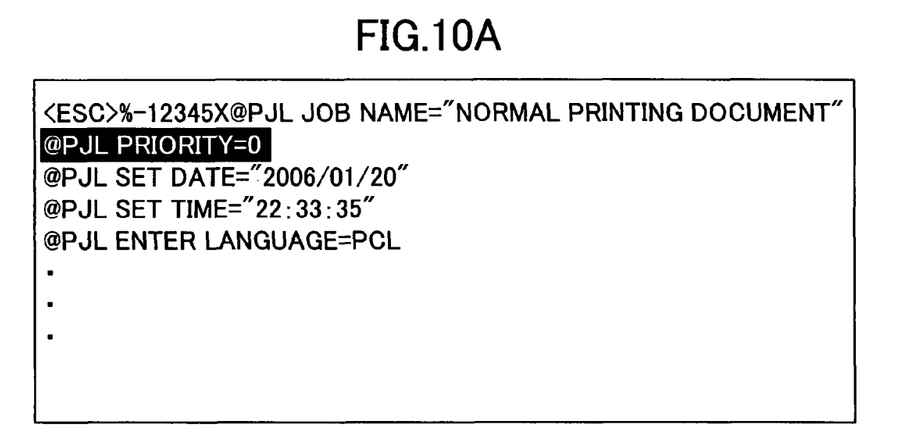
FIG. 10A shows an exemplary configuration of printing data corresponding to a document for normal printing according to an embodiment of the present invention.
Figure 10B:
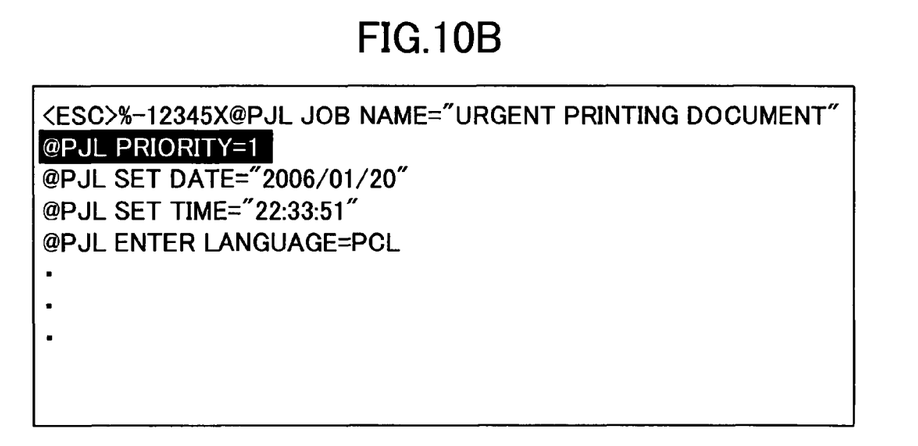
FIG. 10B shows an exemplary configuration of a subsequently received printing data corresponding to a document for urgent printing according to an embodiment of the present invention.

FIGS. 10A-10B are schematic diagrams showing an exemplary configuration of printing data having priority written thereto. More specifically, FIG. 10A shows an exemplary configuration of printing data corresponding to a document for normal printing according to an embodiment of the present invention, and FIG. 10B shows an exemplary configuration of a subsequently received printing data corresponding to a document for urgent printing according to an embodiment of the present invention. Both printing data have a PRIORITY variable (indicated with white color characters in black box of FIGS. 10A and 10B) that indicates a priority (priority level). The priority level of the printing data shown in FIG. 10A is 0 and the priority level of the printing data shown in FIG. 10B is 1. Accordingly, although the printing data of FIG. 10B is received after receiving the printing data of FIG. 10A, the printing data of FIG. 10A is output before the printing data of FIG. 10B according to priority.

In the above case where priority (priority) level is written beforehand in the printing data, the priority (priority level) may be input to the printing data by the host terminal 12*a*, 12*b*. Alternatively, the priority (priority level) may be input to the printing data in accordance with the controls by the control panel 23 of the image forming apparatus 1 after the image forming apparatus 1 receives the printing data from the host terminal 12*a*, 12*b*.

[Modified Example]

Although the image forming apparatus 1 according to an embodiment of the present invention is described by using an example of applying the image forming apparatus 1 to a case of interrupting the processing of data transmitted from a host computer 12*a*, 12*b* via a network, the image forming apparatus 1 may also be applied to a case where of interrupting the processing of data read out by the image forming apparatus.

Furthermore, the above-described interruption operation of the image forming apparatus 1 according to an embodiment of the present invention may be conducted by a program stored in a memory (e.g. HDD, ROM) of the image forming apparatus 1. In other words, the above-described image forming apparatus 1 can be realized by having a computer or the like execute a program dedicated to perform the above-described interruption operation of the image forming apparatus 1.

Hence, the above-described embodiment of the present invention provides an image forming apparatus for forming images by outputting a plurality of image data in an order corresponding to an input order of a plurality of input data, the image forming apparatus including: a data receiving part for receiving the input data; a priority determining part for determining priority of outputting the input data; a PDL process part having a plurality of PDL interpretation parts including at least first and second PDL interpretation parts for performing a PDL process on the input data; and a PDL control part for controlling each of the plural PDL interpretation parts; wherein when a subsequent input data is determined to have a priority higher than that of a prior input data in a case where the first PDL interpretation part is performing a first PDL process on the prior input data, the PDL control part is configured to stop the first PDL process and cause the second PDL interpretation part to perform a second PDL process on the subsequent input data.

By providing a PDL interpretation part having plural PDL interpretation parts, a subsequent job having higher priority than a prior job can be processed without having to cancel all prior jobs even in a case where the prior job is in the middle of being processed. That is, in a case where a previously input data is being processed, the processing of the previously input data is temporarily stopped, the CPU (Central Processing Unit) and the memory of the image forming apparatus are assigned for processing a subsequently input data having priority higher than the previously input data, thereby enabling interruption of printing jobs. It is to be noted that the temporarily stopped processing of the previously input data may be automatically resumed after the processing of the subsequent input data.

In the image forming apparatus according to an embodiment of the present invention, the image forming apparatus may further include an output order storage part for storing plural data related to the plural input data and storing an output order according to the input order. Thereby, the output order can be easily stored without any other additional parts.

In the image forming apparatus according to an embodiment of the present invention, the image forming apparatus may further include: an output order storage part for storing an output order according to a printing order management queue having IDs for identifying the plural input data. Thereby, in a case of changing the output order, the output order can be changed simply by rewriting the output order management queue.

In the image forming apparatus according to an embodiment of the present invention, the priority determination part may include a priority determination table indicating a plurality of printing parameters of the plural input data. Thereby, the setting and changing of priority can be easily conducted by managing priorities and the priority parameters in the table.

In the image forming apparatus according to an embodiment of the present invention, the plural printing parameters may include port number data.

In the image forming apparatus according to an embodiment of the present invention, the plural printing parameters may include input protocol data.

In the image forming apparatus according to an embodiment of the present invention, the plural printing parameters may include a printing name defined by corresponding protocol.

In the image forming apparatus according to an embodiment of the present invention, the priority determining part may determine priority of outputting the input data according to a priority written in the input data. Thereby, the output order can be changed according to the priority arbitrarily determined by the user.

In the image forming apparatus according to an embodiment of the present invention, the image forming apparatus may further include an output order changing part for changing the output order stored in the output order storage part according to the priority determined by the priority determination part. Thereby, input data are output according to the input order in a case of outputting data having equal priority (priority level) since the output order corresponds to input order unless the output order is changed in accordance with priority. Thereby, the printing operation can be conducted in a manner anticipated by the user.

In the image forming apparatus according to an embodiment of the present invention, the number of PDL interpretation parts included in the PDL process part may correspond to the number of priorities that can be determined by the priority determination part.

Thereby, in a case where a subsequent input data having higher printing priority than a prior input data, the subsequent input data having higher priority can be processed before the processing of the prior input data.

Further, the present invention is not limited to these embodiments, but variations and modifications may be made without departing from the scope of the present invention.

The present application is based on Japanese Priority Application No. 2006-075648 filed on Mar. 17, 2006, with the Japanese Patent Office, the entire contents of which are hereby incorporated by reference.

What is claimed is:

1. An image forming apparatus for forming images by outputting a plurality of image data in an order corresponding to an input order of a plurality of input data, the image forming apparatus comprising:
    a data receiving part for receiving the input data;
    a priority determining part for determining priority of outputting the input data;
    a PDL process part having a plurality of PDL interpretation parts including at least first and second PDL interpretation parts for performing a PDL process on the input data; and
    a PDL control part for controlling each of the plural PDL interpretation parts;
    wherein when a subsequent input data is determined to have a priority higher than that of a prior input data in a case where the first PDL interpretation part is performing a first PDL process on the prior input data, the PDL control part is configured to stop the first PDL process and cause the second PDL interpretation part to perform a second PDL process on the subsequent input data,
    wherein the number of PDL interpretation parts included in the PDL process part corresponds to the number of priorities that can be determined by the priority determination part.

2. The image forming apparatus as claimed in claim 1, further comprising:
    an output order storage part for storing plural data related to the plural input data and storing an output order according to the input order.

3. The image forming apparatus as claimed in claim 1, further comprising:
    an output order storage part for storing an output order according to a printing order management queue having IDs for identifying the plural input data.

4. The image forming apparatus as claimed in claim 1, the priority determination part includes a priority determination table indicating a plurality of printing parameters of the plural input data.

5. The image forming apparatus as claimed in claim 4, wherein the plural printing parameters include port number data.

6. The image forming apparatus as claimed in claim 4, wherein the plural printing parameters include input protocol data.

7. The image forming apparatus as claimed in claim 4, wherein the plural printing parameters include a printing name defined by corresponding protocol.

8. The image forming apparatus as claimed in claim 1, wherein the priority determining part determines priority of outputting the input data according to a priority written in the input data.

9. The image forming apparatus as claimed in claim 2, further comprising:
    an output order changing part for changing the output order stored in the output order storage part according to the priority determined by the priority determination part.

* * * * *